March 12, 1974 — R. C. BOOMER — 3,796,640
VAPOR COMPRESSION DISTILLATION
Filed Feb. 20, 1973
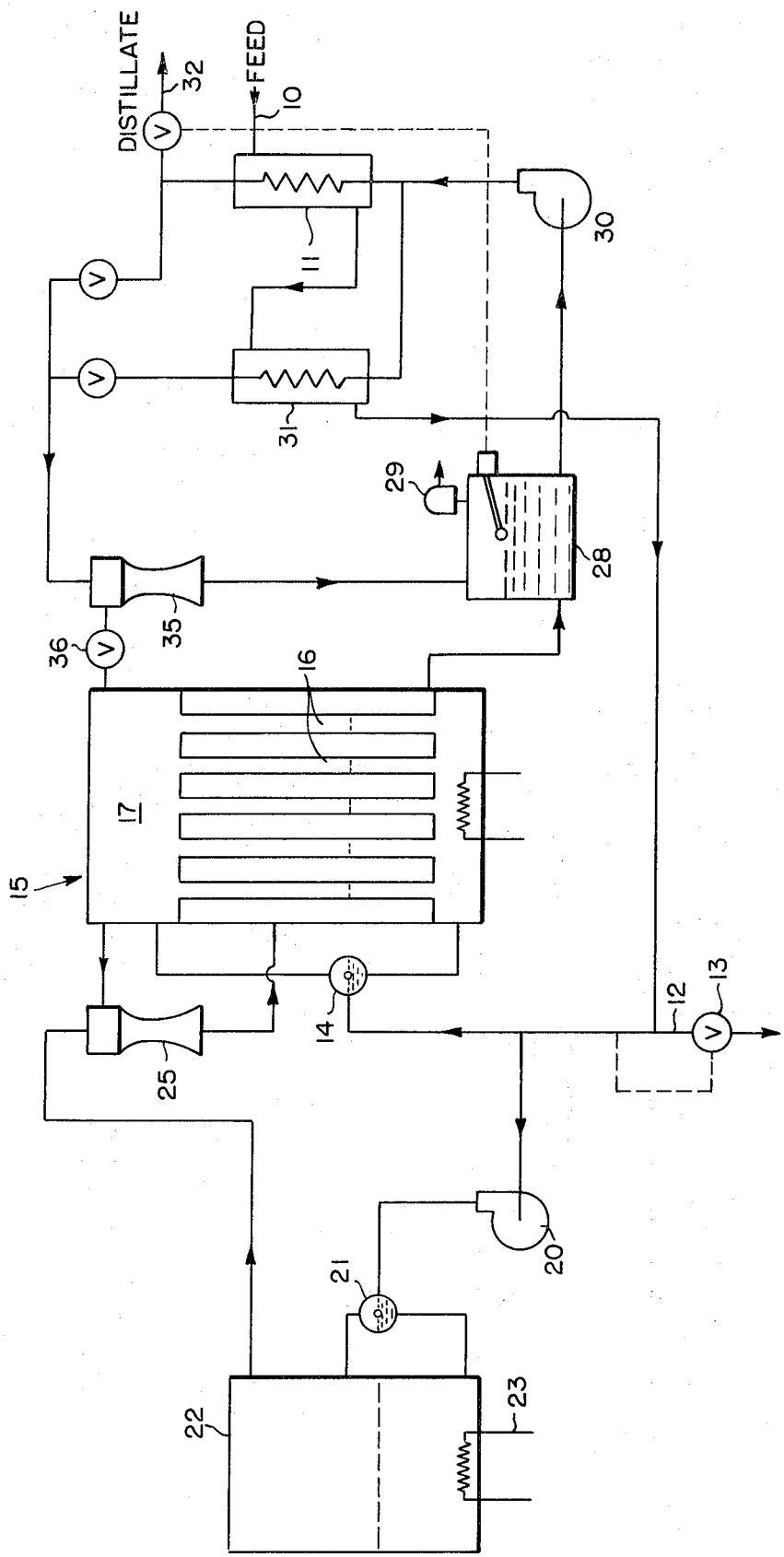

United States Patent Office
3,796,640
Patented Mar. 12, 1974

3,796,640
VAPOR COMPRESSION DISTILLATION
Roger C. Boomer, Hingham, Mass., assignor to
Sybron Corporation, Rochester, N.Y.
Filed Feb. 20, 1973, Ser. No. 334,119
Int. Cl. B01d 3/10; C02b 1/06
U.S. Cl. 203—11                                    10 Claims

ABSTRACT OF THE DISCLOSURE

The vapors evolved in a vapor compression distillation system are evacuated from the evaporator by a vapor driven ejector and by an ejector driven by a stream of purified liquid. The effluent from the vapor driven ejector is placed in indirect heat exchange relationship with the liquid being evaporated, whereby additional liquid is vaporized and substantially all of the ejector effluent is condensed. Substantially all of the vapor evacuated by the liquid driven ejector is condensed in the discharge stream from this ejector. Preferably, the condensed effluents from both ejectors are mixed; and part of this collected effluent, or distillate, is recirculated to drive the liquid driven ejector.

BACKGROUND OF THE INVENTION

This invention relates to vapor compression distillation. In this type of distillation, the evolved vapor is compressed and used to heat the liquid being evaporated. As a result, most, if not all, of the latent heat of vaporization is recovered and the energy requirements of the process are reduced. The vapors are generally compressed either by mechanical compressors, jet ejectors driven by a vapor such as steam, or jet ejectors driven by a high temperature, high pressure liquid. While vapor driven jet ejectors possess certain advantages over the other types of systems in terms of simplicity and low initial cost, certain disadvantages of vapor systems have kept them from being widely adopted.

One of the chief disadvantages of prior art vapor driven systems has been that they were thermally unbalanced. If the entire effluent from the ejector, containing both the compressed vapor and the motive vapor, was returned to the evaporator and used to evaporate additional liquid, the heat input to the evaporator was more than enough to keep the system in balance. As a result, unless a use could be found for some of the energy in the compressed vapor stream, part of this energy was wasted, which reduced the efficiency of the system. Furthermore, it was frequently necessary to de-superheat the compressed vapor stream in order to maintain proper heat exchange conditions in the evaporator. This complicated the system and also reduced its efficiency.

SUMMARY OF THE INVENTION

It is an object of this invention to provide an improved vapor compression distillation process using ejectors.

Another object of this invention is to provide a vapor compression distillation process in which the evaporator is thermally balanced. A further object is to provide a process in which the thermal balance of the evaporator is maintained automatically. Yet another object is to provide a vapor compression distillation system with increased efficiency.

According to this invention, the liquid to be distilled is vaporized in an enclosed chamber, such as a calandria or similar evaporator, and in a vapor generator operated at a higher pressure than the chamber. The evolved vapor is evacuated from the chamber by a first jet ejector driven by a stream of vapor from the generator and by a second jet ejector driven by a stream of purified liquid at a temperature below the temperature of the evolved vapor. The effluent from the first jet ejector is placed in indirect heat exchange relationship with the liquid in the enclosed chamber; whereby additional liquid is vaporized and substantially all of the first ejector effluent is condensed. Substantially all of the vapor evacuated by the second ejector is condensed in the second ejector effluent.

The two ejectors provide a means for thermally balancing the system so that the amount of heat in the compressed vapor stream returned to the evaporator is just enough to keep vaporizing liquid at the same rate. Also, since less energy is required to drive the liquid ejector than would be required to remove the same amount of vapor with the first ejector, this process is more efficient than prior art processes that rely strictly on vapor driven ejectors.

Preferably, part of the second ejector effluent is recirculated to drive this ejector. This makes the process self balancing. If the system becomes unbalanced and the temperature of the liquid utilized to drive the second ejector starts to increase, this ejector will evacuate less vapor from the enclosed chamber. When this happens, the temperature of the second ejector effluent will start to drop. Conversely, if the temperature of the second ejector motive stream falls, the ejector will evacuate more vapor and the temperature of the effluent stream will increase. Thus, the process will tend to stabilize itself at a constant second ejector effluent temperature and a constant second ejector motive stream temperature.

Other objects and advantages of this invention will become apparent from the following description of the system shown in FIG. 1.

DRAWING

FIG. 1 is schematic diagram of one embodiment of this invention.

DETAILED DESCRIPTION

For simplicity, the illustrated system will be discussed in connection with the distillation of water. However, it is equally applicable to the distillation of a wide variety of other liquids.

The impure water or other liquid enters through feed line 10 and passes through heat exchangers 11 and 31, wherein the feed, or make-up, water cools the distilled product water and the distillate recirculated to drive the liquid driven jet ejector. In some cases, for example, where the feed water is warmer than usual, it may be desirable to pass more feed water through the heat exchangers than is needed for make-up. In this case, the additional feed water is bled off through line 12, which may be controlled by a valve 13 operated by a temperature sensor in the line from the heat exchangers.

The remaining feed water is split into two streams. One passes through a float feeder 14 and into the vacuum side of an evaporator 15, commonly referred to as a calandria. The water in the calandria passes up through a number of vertical tubes 16, wherein the water is heated and vaporized. The evolved vapor collects in the vapor space 17 at the top of the calandria. As in most vapor compression systems, an auxiliary heater 18 is provided in the bottom of the calandria to reduce start-up time. This heater is not used once the calandria has been heated to its normal operating temperature.

The rest of the incoming feed water passes through a pump 20 and a second float feeder 21 to a steam generator 22, wherein it is vaporized by heat supplied by a heater 23 such as an electrical immersion unit, steam coil, gas or oil burner or the like. Generator 22 is operated at a higher pressure than the calandria 15, and the steam from generator 22 is used as the motive fluid in a jet ejector 25 which pumps part of the vapor generated in calcandria 15 from the vapor space 17. The effluent stream from ejector 25 passes into the pressure side of the calandria and flows around the tubes 16. Since this effluent is at a higher pressure and temperature than the water inside the tubes, the ejector effluent condenses while the water inside the tubes boils. The condensed ejector effluent, or distillate, goes to a distillate collection tank 28. This tank is preferably held at a relatively high temperature, such as 200° F., in order to flash off volatile gases such as carbon dioxide, which are discharged through a vent valve 29.

The distillate is discharged from tank 28 by a pump 30 and split into two streams. One passes through heat exchanger 11, wherein it is cooled and the incoming feed water is heated. The other stream passes through heat exchanger 31, wherein it is cooled and the feed water is further heated.

The distillate from heat exchanger 11 is split again into two streams. One stream is discharged through a product line 32, which preferably includes a float operated valve installed in the distillate collection tank or a valve controlled by a level sensor on the tank. The other stream is mixed with the distillate from heat exchanger 31 and serves as the motive fluid for a second jet ejector 35, which also pumps vapor from the calandria.

The vapor evacuated by ejector 35, instead of passing through the shell side of the calandria, is condensed in the effluent stream leaving the ejector and goes directly to the distillate collection tank 28. Thus, by varying the proportional amounts of vapor evacuated by the two ejectors 25 and 35, the amount of vapor removed from the calandria can be adjusted so that just enough heat is supplied to keep water vaporizing in the calandria at the desired rate. Typically, the ejectors are selected and operated so that the mass flow rate at which vapor is evacuated by the water ejector 35 is substantially the same as the mass flow rate at which high pressure steam is supplied to ejector 25. Under these conditions, the mass flow rate at which the effluent from ejector 25 passes to the shell side of the calandria is substantially the same as the mass flow rate at which vapors evolve in the calandria.

The use of the water ejector also reduces the amount of vapor evacuated by the stream ejector; thereby reducing the amount of vapor returned to the pressure side of the calandria and eliminating the need to de-superheat the effluent from the steam ejector. This increases the efficiency of the process because the amount of energy required to recirculate distillate with pump 30, which typically operates at a relatively low discharge pressure such as 15 to 30 p.s.i., is considerably less than the amount of energy that would have to be removed from the steam ejector effluent to keep the calandria thermally balanced if all of the vapor was evacuated with the steam ejector. Thus, the combination of the two ejectors can produce the same amount of distillate with less energy input.

For a given size water ejector, the amount of vapor evacuated depends on the motive water temperature and pressure and the temperature rise of the motive water in the ejector. To insure complete condensing of the vapor, the temperature rise of the motive water should not bring it to its boiling point and the pressure drop between the motive water inlet and the discharge or effluent stream should be sufficient to insure mixing of the vapor with the motive water stream.

In order to keep the system in balance, the suction pressure of water ejector 35 must be substantially the same as the suction pressure of steam ejector 25. Recirculating part of the collected distillate in tank 28 to drive water ejector 35 serves to maintain the proper water ejector suction pressure automatically. If the amount of vapor evacuated increases, the temperature of the collected distillate in tank 28 and the temperature of the motive water stream increase. This decreases the capacity and suction pressure of, or vacuum pulled by, the water ejector. Conversely, if the temperature of the motive fluid decreases for any reason, the ejector 35 will withdraw more vapor from the calandria, which will tend to increase the temperature of the distillate in tank 28 and the temperature of the recirculated motive liquid. Thus, the water ejector tends to seek and maintain a constant motive stream temperature, which automatically keeps the steam and water ejectors in balance.

With typical vapor and liquid driven jet ejectors, the self correcting action of the liquid drive ejector 35 will only come into play when the temperature of the motive fluid is near the temperature of the vapor being evacuated. If cold water is utilized as the motive fluid, ejector 35 will have a tendency to pull a higher vacuum (lower absolute pressure) in vapor space 17 than the vapor driven ejector 25 is capable of producing. When this happens, ejector 25 will stop evacuating vapor and the effluent from ejector 25 will not keep liquid vaporizing at the desired rate in the calandria. To prevent this, a valve 36 is provided in the suction line of ejector 35. During start-up this valve is kept closed until the rest of the system has heated up and distillate is being recirculated from tank 28 through ejector 35 at a temperature near the temperature of the vapor. Valve 36 may be a temperature operated valve set to open when the temperature of the recirculated distillate reaches a certain level, which for typical cases, may be 30 to 40° F. below the temperature of the vapor in the calandria. When the valve opens, the system balances itself as described above.

Of course, those skilled in the art may make various changes in the system and process disclosed above. The foregoing description is merely illustrative and is not intended to limit the scope of this invention, which is defined by the following claims.

I claim:
1. A process for distilling liquid comprising:
    vaporizing the liquid in an enclosed chamber and in a vapor generator operated at a higher pressure than said chamber;
    evacuating vapor from said chamber with a first jet ejector driven by a stream of vapor from said generator and with a second jet ejector driven by a stream of purified liquid at a temperature below the temperature of the vapor in the chamber;
    placing the effluent from the first jet ejector in indirect heat exchange relationship with the liquid in the enclosed chamber, whereby additional liquid is vaporized and substantially all of the first ejector effluent is condensed; and
    condensing substantially all of the vapor evacuated by the second ejector in the second ejector effluent.
2. A process according to claim 1 wherein part of the second ejector effluent is recirculated to drive the second ejector.
3. A process according to claim 2 wherein at least part of the recirculated effluent from the second ejector is cooled before it is used to drive the second ejector.
4. A process according to claim 3 wherein at least part of the recirculated effluent is cooled by indirect heat exchange with incoming make-up liquid.
5. A process according to claim 1 wherein the rate at which vapor is evacuated by the liquid driven ejector is substantially the same as the rate at which high pressure vapor is supplied to the vapor driven ejector.
6. A process according to claim 1 wherein the effluent from the vapor driven jet ejector is condensed and mixed with the effluent from the liquid driven jet ejector.
7. A process for distilling water comprising:
    vaporizing water in an enclosed chamber and in a steam generator operated at a higher pressure than the enclosed chamber;
    evacuating vapor from the enclosed chamber with a first jet ejector driven with steam from the generator;

placing the effluent from the jet ejector in indirect heat exchange relationship with the water in the enclosed chamber, whereby additional water is vaporized and substantially all of the vapor in the ejector effluent is condensed;

passing part of the condensed effluent through a second jet ejector, evacuating vapor from the enclosed chamber with said second ejector and condensing substantially all of the vapor evacuated by the second ejector in the second ejector effluent; and mixing the effluent from the second jet ejector with the condensed effluent from the first jet ejector, recirculating part of the resulting mixture to drive the second jet ejector and discharging the rest of the mixture as purified distillate.

8. A process according to claim 7 which is initiated by evacuating all of the vapor from the enclosed chamber with the first jet ejector until the temperature of the recirculated effluent reaches a certain level, and then evacuating part of the vapor from the enclosed chamber with the first ejector and evacuating the rest of the vapor with the second ejector.

9. A process according to claim 7 wherein the recirculated effluent is cooled before it is used to drive the second jet ejector.

10. A process according to claim 9 wherein the recirculated effluent is cooled by indirect heat exchange with incoming make-up water.

References Cited

UNITED STATES PATENTS

| | | | |
|---|---|---|---|
| 3,326,778 | 6/1967 | Mock | 203—11 |
| 3,288,685 | 11/1966 | Kemper et al. | 203—26 |
| 3,109,782 | 11/1963 | Nathan | 203—25 |
| 3,183,174 | 5/1965 | Williamson | 203—22 |
| 3,248,304 | 4/1966 | Goeldner | 203—21 |
| 3,131,110 | 4/1964 | Duval | 203—22 |

NORMAN YUDKOFF, Primary Examiner

D. SANDERS, Assistant Examiner

U.S. Cl. X.R.

203—26; 202—205